United States Patent [19]
Garau et al.

[11] Patent Number: 5,388,343
[45] Date of Patent: Feb. 14, 1995

[54] MEASURING MACHINE

[75] Inventors: Enrico Garau, Turin; Pasqualino Poggi, Moncalieri; Domenico Sola, Rivalta, all of Italy

[73] Assignee: DEA spa, Turin, Italy

[21] Appl. No.: 98,458

[22] Filed: Jul. 27, 1993

[30] Foreign Application Priority Data

Jul. 31, 1992 [IT] Italy ................ TO92 A 000661

[51] Int. Cl.$^6$ .................... G01B 5/03; G01B 7/03
[52] U.S. Cl. ............................. 33/503; 33/1 M
[58] Field of Search ..................... 33/503, 1 M

[56] References Cited

U.S. PATENT DOCUMENTS

| | | | |
|---|---|---|---|
| 3,241,243 | 3/1966 | Speer | 33/503 |
| 4,651,439 | 3/1987 | Band et al. | 33/503 |
| 4,766,674 | 8/1988 | Zanier et al. | 33/503 |
| 5,142,790 | 9/1992 | Raho et al. | 33/503 |

FOREIGN PATENT DOCUMENTS 1167413  7/1985  U.S.S.R. ................ 33/503

*Primary Examiner*—Christopher W. Fulton
*Attorney, Agent, or Firm*—Michael N. Meller

[57] ABSTRACT

A measuring machine includes a base, a portal movable on the base along a first horizontal axis and having a cross-member extending along a second horizontal axis perpendicular to the first, a carriage carried by the cross-member and movable along the second axis on a guide formed on the cross-member, and a measuring head carried by the carriage and movable relative thereto along a third, vertical axis; the guide defines a main slide plane inclined at 45° to the reference plane, the cross-member and the carriage having elongate sections in directions parallel to this main slide plane

10 Claims, 3 Drawing Sheets

MEASURING MACHINE

BACKGROUND OF THE INVENTION

The present invention relates to a measuring machine, particularly of the portal type.

It is known that portal measuring machines include a base defining a horizontal reference plane adapted to support a body to be measured in a fixed manner, a portal movable on the base along a first horizontal axis (X) and having a cross-member extending along a second horizontal axis (Y) perpendicular to the first, a carriage movable on the cross-member along the Y axis and a measuring head carried by the carriage and movable relative thereto along a third, vertical axis (Z). The head carries a tracer point at its lower free end.

Generally the carriage is supported for sliding movement on the cross-member by a plurality of pneumatic bearing pads which cooperate with respective slide tracks for the bearing pads themselves, formed on the cross-member. The arrangement of the slide surfaces and of the bearing pads is such as to enable the carriage to slide along the Y axis with the minimum friction but to prevent any other translational movement (along the X and Z axes) and rotational movement (about any one of the three axes X, Y and Z).

In known measuring machines, the slide surfaces are formed on the cross-member in positions which define a main slide plane for the carriage which is parallel to the YZ plane or to the XY plane, and the slide surfaces are sufficiently spaced from each other in this plane as to optimise the torsional rigidity about the Y axis; hence, the cross-member and the carriage generally have cross-sections which are elongate in directions parallel to the Z axis or to the X axis. The slide surfaces may be perpendicular to the X and Z coordinate axes or, more conveniently, formed on a guide of dovetail shape.

These known configurations involve a certain number of problems.

First of all, when the cross-section of the carriage is elongate in the Z direction, torsional rigidity about the X axis is generally poor; it is, however, desirable for this rigidity to be sufficiently high (as in the case of the rigidity to rotations about the Y axis) since the distance of the tracer point from the centre of gravity of the carriage amplifies the rotational movements to a greater extent the more the head projects and hence introduces errors into the measurements.

A further problem connected with the elongate form in the Z direction is a greater sensitivity to thermal gradients which, under normal conditions, are observed mainly in the vertical direction; different regions of the carriage are thus subject to differing thermal expansions which introduce errors into the measurements or at least must be compensated for by processing of the measurements detected.

In known solutions in which the cross-member and the carriage have elongate sections in the direction of the X axis, these problems are reduced but others present themselves.

In particular, the rigidity of the cross-member against bending in the YZ plane is somewhat reduced with the obvious disadvantages this involves; moreover, the overall bulk of the carriage in the X direction, including that part of the carriage which houses and guides the head and which must, therefore, project outwardly of the transverse bulk of the cross-member, is excessive and this, in addition to being disadvantageous in itself, causes a very disadvantageous mass distribution from the inertial point of view: a high moment of inertia involves inertial couples of considerable magnitude, particularly in view of the strong accelerations to which the carriage is subject in use.

A further disadvantage of known configurations, which all have upwardly facing horizontal slide surfaces, is the accumulation of dust and dirt in general under gravity which therefore necessitates frequent maintenance.

SUMMARY OF THE INVENTION

The object of the present invention is to provide a measuring machine which is free from the disadvantages connected with the known measuring machines specified above.

This object is achieved by the present invention in that it relates to a measuring machine of the type comprising:
- a base having an upper horizontal reference plane parallel to first and second axes of a set of three cartesian axes;
- a portal movable on the base along the first axis and having a cross-member extending along the second axis;
- a carriage carried by the cross-member and movable thereon along the second axis;
- a measuring head carried by the carriage and movable relative thereto along a third axis of the set of three axes;

the cross-member including a guide for the carriage, the carriage having a plurality of bearing pads cooperating with respective slide surfaces of the guide, characterised in that the guide defines a main slide plane for the carriage which forms an acute dihedral angle with the reference plane, the guide and the carriage having cross-sections which are elongate in directions parallel to the main slide plane.

BRIEF DESCRIPTION OF THE DRAWINGS

The invention will now be described with reference to the appended drawings, which illustrate one non-limiting embodiment, in which.

DETAILED DESCRIPTION OF THE INVENTION

Figure 1:
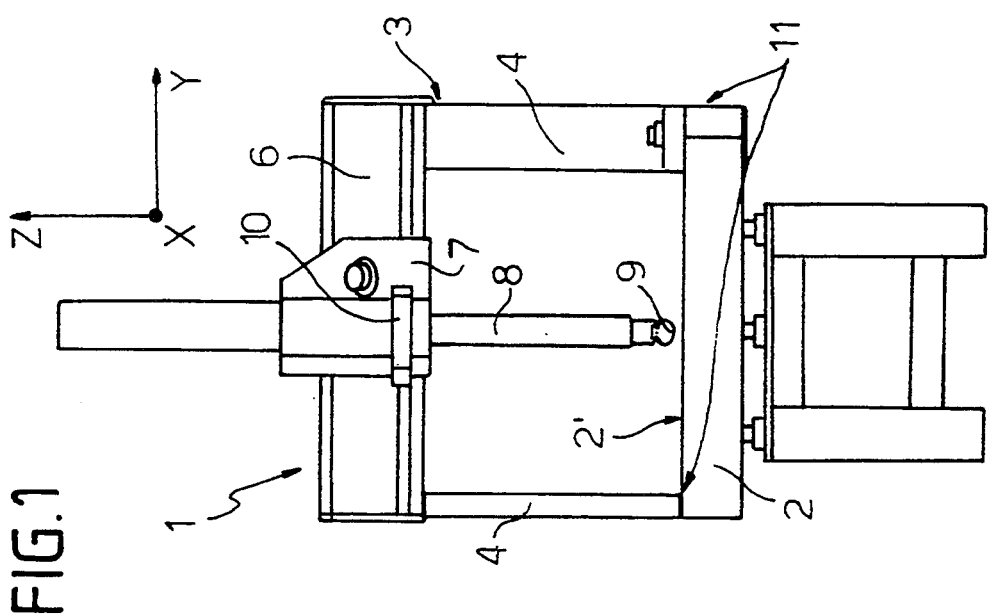
FIG. 1 is a front elevational view of a measuring machine formed in accordance with the principles of the present invention.

With reference to FIG. 1, a measuring machine generally indicated 1 includes essentially a flat base 2 having a horizontal reference plane 2' parallel to a pair of horizontal axes X and Y of a set of three cartesian axes X,Y,Z arranged to support an object to be measured (not illustrated), a portal 3 movable relative to the base 2 along the X axis and including a pair of uprights 4 and a cross-member 6 extending parallel to the Y axis (perpendicular to the plane of FIG. 1), a carriage 7 carried by the cross-member 6 of the portal 3 and movable thereon along the Y axis, and a head 8 carried by the carriage 7 and movable relative thereto along the Z axis. A tracer point 9 is fixed, in use, to a lower end of the head 8.

The carriage 7 is conveniently provided with a handgrip 10 at the front (not illustrated for simplicity in FIGS. 2 and 3) adapted to be gripped so that the movement of the portal 3 along the X axis and of the carriage 7 along the Y axis can be driven manually; the carriage 7 further incorporates means, also not illustrated in that they are known, for converting a rotational movement of the handgrip 10 into a translational movement of the head 8 along the Z axis.

The uprights 4 of the portal 3 are guided on the base 2 by guide means generally indicated 11 and adapted to allow it to slide along the X axis and to prevent any other degree of translational and rotational freedom.

Figure 2:
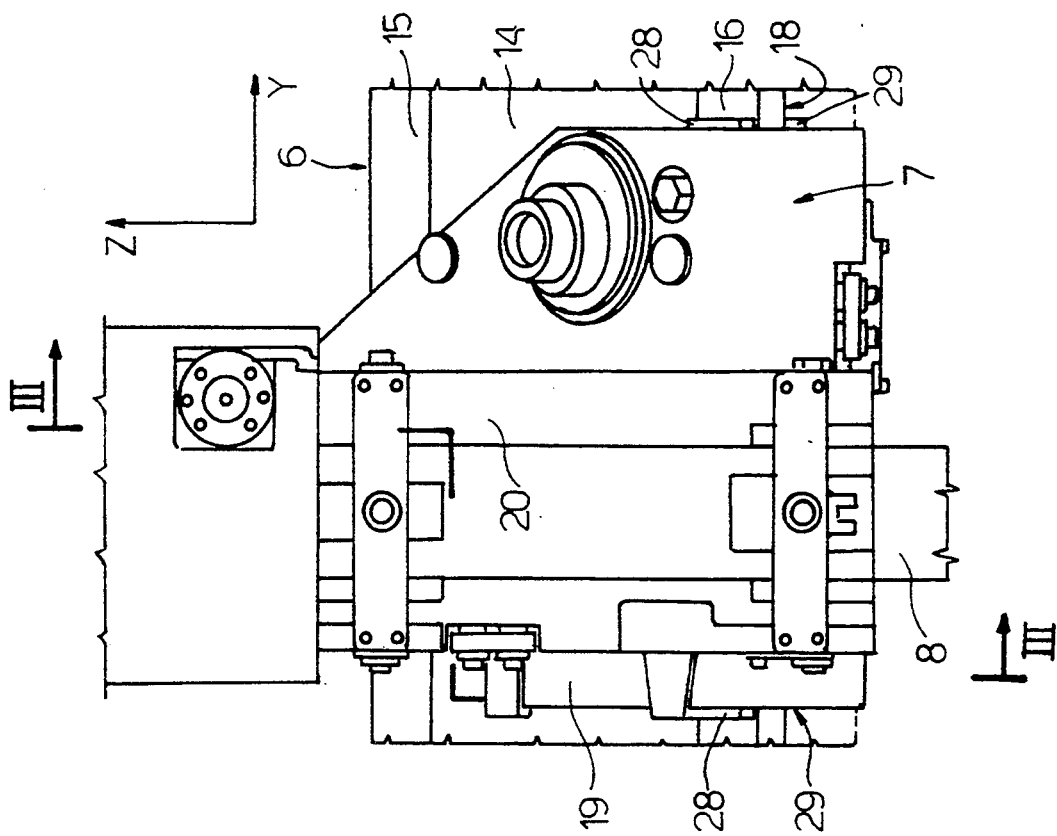
FIG. 2 illustrates a detail of FIG. 1 on an enlarged scale.
Figure 3:
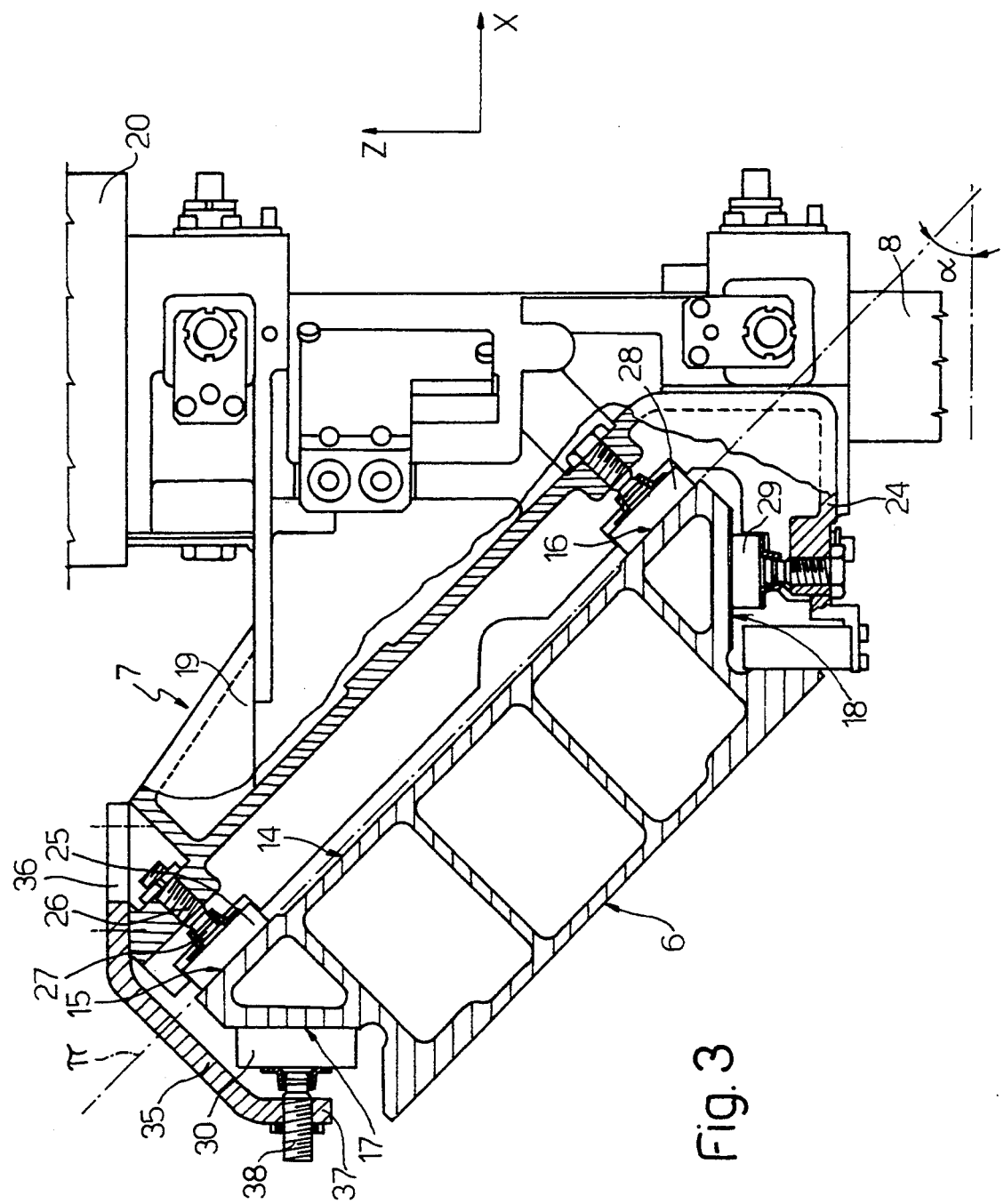
FIG. 3 is a section taken on the line III—III of FIG. 2.

As illustrated in FIGS. 2 and 3, the cross-member 6 is constituted by an aluminium alloy extrusion having a constant section which is elongate and inclined at 45° to the plane 2'. More particularly, an upper front portion of the cross-member 6 defines an integral dovetail shaped guide 14 of isosceles trapezium section with the longer base facing forwardly and upwardly and lying in a plane π which converges with the plane 2' towards the front region of the machine 1 and forms a dihedral angle α of 45° therewith. The guide 14 has a pair of slide surfaces 15,16 along respective upper and lower, forwardly-facing edge portions of one face of the guide itself defining the said longer base of the trapezium in section, and thus lying in the plane π defined above, which constitutes a main slide plane for the carriage 7. The guide 14 further includes two additional slide surfaces 17,18 formed on respective faces of the guide itself defining the inclined sides of the trapezium in section. The surface 17 lies on a rear vertical plane of the guide 14 close to the surface 15 while the surface 18 lies on a lower horizontal plane of the guide 14 close to the surface 16.

The carriage 7 has a main body 19 facing the main slide plane π and having a transverse section which is elongate in a direction parallel to this plane. A tubular body 20 projects from the front of the main body 19 and is arranged with its axis vertical to guide the head 8 in conventional manner.

From the main body 19 of the carriage 7 there also projects a lower cranked member 24 which extends around the lower edge of the guide 14 and faces the surface 18 of the guide itself.

The carriage 7 is slidably supported on the guide 14 by a plurality of pneumatic bearing pads which cooperate with the slide surfaces described above.

In particular, a first bearing pad 25 is fixed to an upper central zone of the main body 19 of the carriage 7 by an axially-adjustable threaded pin 26, one end 27 of which defines a spherical abutment for the bearing pad itself. The bearing pad 25 is arranged to slide on the surface 15.

Two bearing pads 28 are fixed in a similar manner to that described above for the bearing pad 25 (but so as to be axially fixed) to respective lower side regions of the main body 19 of the carriage 7 so as to be spaced as far away from each other as possible in a direction parallel to the Y axis. The bearing pads 28 cooperate with the slide surface 16 of the guide 14.

Two further bearing pads 29 are fixed to the lower cranked member 24 of the carriage 7, also as far away from each other as possible in the direction of the Y axis, and cooperate with the lower slide surface 18 of the guide 14.

Finally a bearing pad 30, which cooperates with the slide surface 17, is fixed by resilient means to the carriage 7, which means must have a suitably limited rigidity to compensate for any geometrical irregularities in the slide tracks. More particularly, the resilient means is constituted by a leaf spring 35 which has one end 36 rigidly fixed to the upper central region of the body 19 of the carriage 7 while its opposite end 37 is fixed to the bearing pad 30 by means of an axially adjustable pin 38 entirely similar to the pin 26.

The bearing pads 25, 28, 29 and 30 are connected to a pneumatic circuit, not illustrated in that it is known, for supplying compressed air.

The machine 1 may also include automatic drive means for the portal 3, the carriage 7 and the head 8, which are not described in that they are known and do not form part of the present invention. These means conveniently interface with an external control and processing unit which enables measuring cycles, including a predetermined sequence of movements of the tracer point 9, to be carried out automatically.

Finally, the machine 1 has transducer means not illustrated for generating signals representative of the coordinates of a point of impact of the tracer point 9 with the object to be measured in response to an enabling signal generated by the tracer point itself at the moment of impact; these signals are stored and processed in a conventional manner to enable the coordinates of the point of impact to be calculated.

The operation of the machine 1 is in itself known and will not therefore be described in detail.

With reference to the configuration of the cross-member 6 and of the carriage 7 the following is noted.

The arrangement of the tracks 15,16,17,18 and of the respective bearing pads 25,28,29,30 enables the carriage 7 to effect movements parallel to the Y axis but prevents any movements in directions parallel to the X axis and the Z axis as well as any rotation about the X,Y and Z axes.

The rigidity against rotation about the X and Y axes is thus optimised.

More particularly, rigidity about the Y axis is very good in view of the elongate section of the guide 14 in the plane π (which translates into a considerable length of the arms of the attachment reactions of the bearing pads) and in view of the dovetail configuration of the guide itself; this elongate section does not however involve an excessive bulk in directions parallel to the X and Y axes by virtue of the inclined arrangement. The resulting compact structure of the carriage 7 thus reduces the problems connected with thermal gradients and inertial couples.

The rigidity against rotation about the X axis is given essentially by the bearing pads 28 and the bearing pads 29 which are positioned as far apart as possible along the Y axis. The bearing pad 30, by acting on a surface (17) perpendicular to the X axis, does not contribute to this rigidity. The resilient mounting of the bearing pad 30, needed, as stated above, to compensate for any geometrical irregularities in the slide tracks, does not therefore cause any reduction in this rigidity.

The inclined arrangement of the guide 14 enables good rigidity thereof against bending to be achieved, particularly in the YZ plane, without increasing the vertical bulk excessively.

Finally, the inclined arrangement of the guide 14 is such that none of the slide surfaces is horizontal and upwardly facing; the problems connected with the accumulation of dirt on these surfaces are thus eliminated.

Finally, it is clear that modifications and variations may be made to the machine 1 described without thereby departing from the protective scope of the present invention.

Figure 4:
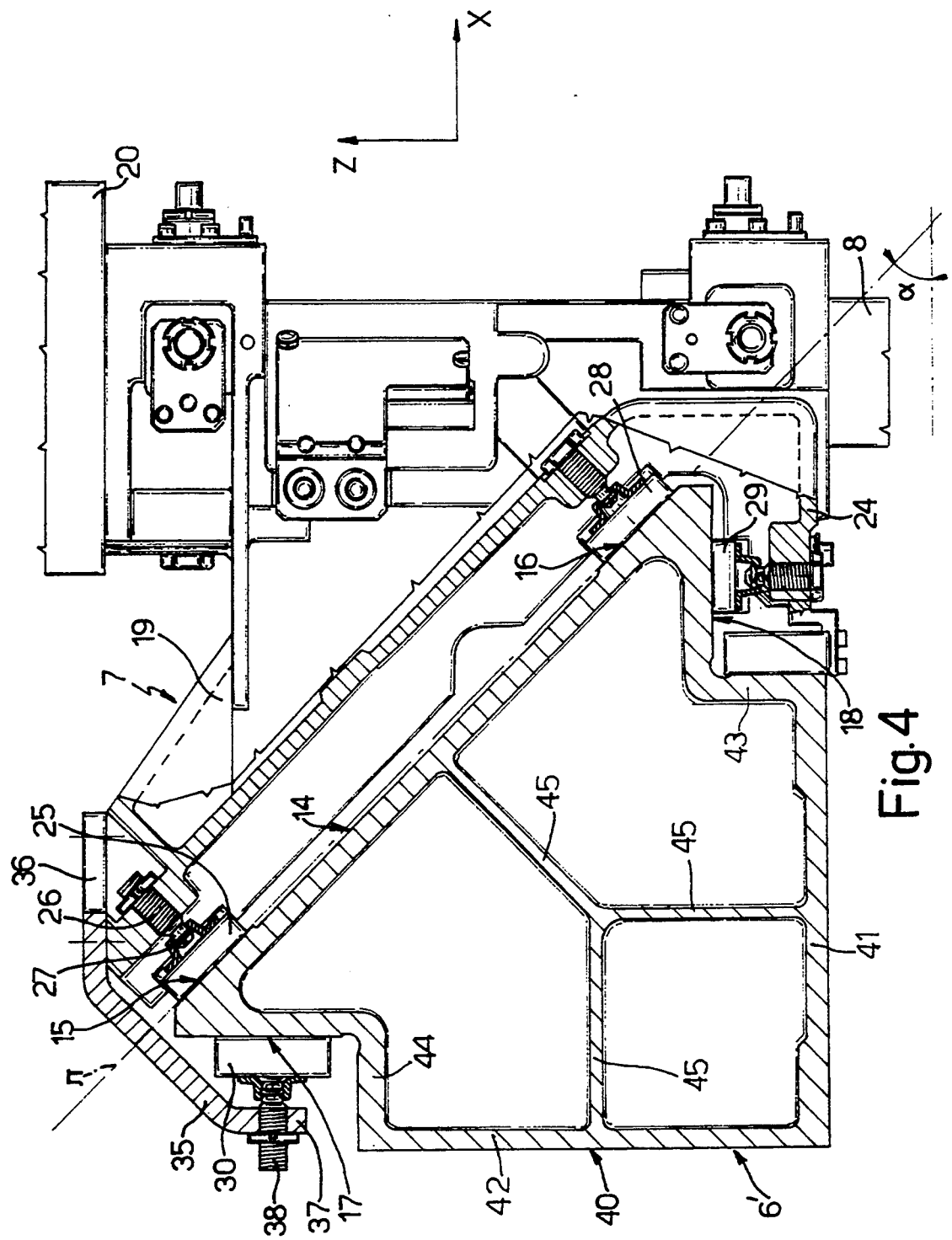
FIG. 4 is a section corresponding to the one of FIG. 3 and showing a different embodiment of the present invention.

In particular, FIG. 4 illustrates a cross-member 6' including a guide 14 which is similar to the one described with reference to FIG. 3, and a stiffening portion 40 having a horizontal bottom wall 41 and a vertical back wall 42 which are connected to the guide 14 in the proximity of slide surfaces 18 and 17 by narrow walls 43, 44 perpendicular to walls 41, 42, respectively. Cross-member 6' further includes internal stiffening ribs 45 connecting walls 41, 42 to guide 14.

We claim:

1. A measuring machine (1) of the type comprising:
   a base (2) having an upper, horizontal reference plane (2') parallel to first and second axes (X, Y) of a set of three cartesian axes (X, Y, Z);
   a portal (3) movable on the base (2) along the first axis (X) and having a cross-member (6) extending along the second axis (Y);
   a carriage (7) carried by the cross-member (6) and movable thereon along the second axis (Y);
   a measuring head (8) carried by the carriage (7) and movable relative thereto along a third axis (Z) of the set of three axes;
   the cross-member (6) including a guide (14) for the carriage (7), the carriage (7) having a plurality of bearing pads (25, 28, 29, 30) which cooperate with respective slide surfaces (15, 16, 18, 17) of the guide (14),
   characterized in that the guide (14) defines a main slide plane ($\pi$) for the carriage (7) which forms an acute dihedral angle ($\alpha$) with the reference plane (2'), the guide (14) and the carriage (7) having cross-sections which are elongate in directions parallel to the main slide plane ($\pi$) and further characterised in that the guide (14) is dovetail shaped and has a section in the form of an isosceles trapezium with the longer base disposed in the main slide plane, the first and second slide surfaces (15, 16) being formed on a face of the guide (14) defining the longer base in section.

2. A machine according to claim 1, characterised in that the main slide plane ($\pi$) converges with the reference plane (2') towards a front region of the machine (1).

3. A machine according to claim 1, characterised in that the guide (14) includes at least a first slide surface (15) and a second slide surface (16) lying in the main slide plane ($\pi$) along opposite upper and lower edges respectively of the guide (14) itself.

4. A machine according to claim 1, characterised in that the guide includes a third slide surface (17) and a fourth slide surface (18) formed on respective faces of the guide (14) itself and defining, in section, the inclined sides of the trapezium close to the said first slide surface (15) and to the said second slide surface (16) respectively.

5. A machine according to claim 4, characterised in that the third and fourth slide surfaces (17, 18) are perpendicular to the first axis (X) and to the third axis (Z) respectively.

6. A machine according to claim 4, characterised in that the carriage (7) includes a bearing pad (25) which cooperates with the first surface (15) and is disposed centrally of the carriage (7), a pair of bearing pads (28) which cooperate with the second slide surface (16) and are disposed at the sides of the carriage (7) as far from each other as possible along the said second axis (Y), a bearing pad (30) which cooperates with the third surface (17) and is disposed centrally of the carriage (7), and a pair of bearing pads (29) which cooperate with the fourth slide surface (18) and are disposed at the sides of the carriage (7) as far from each other as possible along the said second axis (Y).

7. A machine according to claim 6, characterised in that the bearing pad (30) which cooperates with the third slide surface (17) is fixed to the carriage (7) by resilient support means (35).

8. A machine according to claim 7, characterised in that the resilient support means comprise a leaf spring (35).

9. A machine according to claim 1, characterised in that the main slide plane ($\pi$) is inclined at 45° to the reference plane (2').

10. A machine according to claim 1, characterised in that the bearing pads (25, 28, 29, 30) are pneumatic.

* * * * *